United States Patent [19]

Kaminaka et al.

[11] 4,246,620

[45] Jan. 20, 1981

[54] THIN FILM MAGNETIC HEAD AND METHOD FOR MANUFACTURING THE SAME

[75] Inventors: Nobuyuki Kaminaka, Moriguchi; Kenji Kanai, Neyagawa; Norimoto Nouchi, Katano; Noboru Nomura, Kyoto, all of Japan

[73] Assignee: Matsushita Electric Industrial Co., Ltd., Kadoma, Japan

[21] Appl. No.: 8,335

[22] Filed: Jan. 31, 1979

[30] Foreign Application Priority Data

Feb. 3, 1978 [JP] Japan ................... 53-11681

[51] Int. Cl.³ .......................... G11B 5/14; G11B 5/28; G11B 5/42
[52] U.S. Cl. .................... 360/127; 360/121; 29/603
[58] Field of Search .............. 360/125, 121, 126; 29/603

[56] References Cited

U.S. PATENT DOCUMENTS

| | | | |
|---|---|---|---|
| 2,992,474 | 7/1961 | Adams | 360/126 |
| 4,052,749 | 10/1977 | Nomura et al. | 360/126 |

Primary Examiner—Robert S. Tupper
Attorney, Agent, or Firm—Wenderoth, Lind & Ponack

[57] ABSTRACT

A thin film magnetic head having a contact surface which, when such magnetic head is in use, slidingly contacts a magnetic information carrier, such as a magnetic tape, drum or disc, for the information recording or reproduction. The magnetic head comprises a support substrate on which a thin magnetic layer and a non-magnetic layer are deposited in side-by-side relation to each other. The non-magnetic insulating layer has a wear resistance equal to or higher than that of the thin magnetic layer. A method for the manufacture of the thin film magnetic head is also disclosed.

3 Claims, 14 Drawing Figures

THIN FILM MAGNETIC HEAD AND METHOD FOR MANUFACTURING THE SAME

BACKGROUND OF THE INVENTION

The present invention relates to a thin film magnetic head and a method for the fabrication of the same, wherein an improvement has been made to increase the resistance to wear and chapping of the area of contact of the magnetic head with a magnetic information carrier such as a magnetic tape, drum or disc.

The thin film magnetic head to which the present invention pertains is known as a magnetic transducer suited for high density information recording and/or reproduction and various attempts have heretofore been made to improve the electromagnetic transducing characteristic of the thin film magnetic head. However, one of the major problems which is associated with wear and chapping of the contact surface of the thin film magnetic head resulting from the sliding contact with the magnetic information carrier, for example, magnetic tape, has not yet been solved. This problem will now be discussed in more detail with reference to FIGS. 1 and 2 of the accompanying drawings which show, in side sectional and front sectional views, respectively, an exemplary prior art thin film magnetic head of a type having both a common bias layer and a signal conductor layer provided in the magnetic gap thereof.

Referring now to FIGS. 1 and 2, the prior art thin film magnetic head comprises a substrate 1 made of ferrite, for example, and having a first non-magnetic insulating layer 2 formed optionally on one surface of the substrate 1. Provided on the non-magnetic insulating layer 2 are a bias conductor layer 3, a signal conductor layer 4 and a terminal member 5 for electric connection with an external electric circuit (not shown). The conductor layers 3 and 4 are covered by a second non-magnetic insulating layer 6 mounted on the first non-magnetic insulating layer 2, which is in turn overlaid with a thin magnetic layer 7 made of a magnetic material. Overlaying the thin magnetic layer 7 is a third non-magnetic insulating layer 8 to which a retainer plate 9 is bonded by the use of a bonding material 10.

The thin layer magnetic head so fabricated is electrically connected to the external electric circuit through the terminal member 5, and the contact surface of the magnetic head, shown by the broken line 11 in FIG. 1, which, when in use, slidingly contacts a magnetic information carrier, for example, a magnetic tape, is formed by cutting and grinding an unwanted portion of the magnetic head which extends beyond the head contact surface 11.

When the prior art magnetic head of the construction described above is viewed from the head contact surface and, particularly, as shown in FIG. 2, the third non-magnetic insulating layer 8 is seen to have indented portions and, therefore, a considerable amount of the bonding material 10 is considerably exposed. More specifically, since the thickness of the thin magnetic layer 7 has an influence on the efficiency of the magnetic head as a whole, it must have such a value that the thin magnetic layer 7 will not be magnetically saturated. Accordingly, the average thickness required for the thin magnetic layer 7 is generally about 3 μm and, in the case of a thin film magnetic head particularly for use in recording a short wavelength signal, the required thickness of the thin magnetic layer 7 is about 1 μm. The use of a thin magnetic layer 7 of such a thickness results in the indented portions of the third non-magnetic insulating layer 8 being about 1 to 3 μm deep and the consequence is that, as can readily be understood from FIG. 2, the exposed surface area of the deposited bonding material 10 between the retainer plate 9 and the third non-magnetic insulating layer 8 is increased. If the bonding material 10 used is of a type capable of having a relatively high hardness when cured or hardened, there will be no problem of wear and chapping of the head contact surface which may result from the sliding contact with the magnetic tape. For this purpose, a glass is suitable as a bonding material. However, since the glass has a relatively high melting point requiring a relatively high temperature for the glass to reach a fluidized state, the bonding by the use of the glass tends to bring about deterioration in the magnetic characteristic of the finished magnetic head, an increase in the specific resistance of the conductor layers 3 and 4 and/or deterioration in the insulating property of the second non-magnetic insulating layer 6 and, therefore, glass has not yet been employed in practice as the bonding material 10, but instead a synthetic resinous bonding material is largely employed.

If the synthetic resinous bonding material is carefully selected from currently commercially available types and, if necessary, mixed with one or more filler material, the resistance to wear and chapping of the thin film magnetic head can be improved, but only to a certain extent. This is because a life test of a thin film magnetic head wherein resin binder was used has shown that substantially no chapping occurred at the portion 12 of the magnetic head, where substantially no resin binder was applied or, if it was applied was applied in a thickness of about 0.2 μm, while the portion 13 where a relatively large amount of the resin binder was damaged deposited was considerably. The influence of the damage to the portion 13 had extended to the portion 14, located at a leading position relative to the portion 13 with respect to the direction of travel of the magnetic tape shown by the arrow 15, and it has been found that not only were the first, second and third nonmagnetic insulating layers 2, 6 and 8 crumbled, but also respective portions 16 and 17 of the retainer plate 9 and substrate 1 were crumbled. In particular, where the substrate 1 is made of ferrite, the crumbling of the end portion 17 of the substrate 1 resulted in formation of tiny pieces of ferrite which are likely to cause a chapping of the head contact surface during a prolonged use of the thin film magnetic head with the magnetic tape.

As discussed above, the prior art thin film magnetic head having the construction shown in FIGS. 1 and 2 involves various problems associated with reliability and durability.

Although not directed to improvement of resistance to wear and chapping of the head contact surface, U.S. Pat. No. 4,092,688, patented on May 30, 1978 and assigned to the assignee of the present invention, discloses a similar thin film magnetic head.

SUMMARY OF THE INVENTION

Accordingly, the present invention has been made with a view to substantially eliminating the disadvantages and inconveniences inherent in the prior art thin film magnetic head and is intended to provide an improved thin film magnetic head wherein a non-magnetic insulating layer is provided between each two adjacent thin magnetic layers, each of the non-magnetic insulating layers having a wear resistance of a value equal to or higher than that of any one of the thin magnetic layers, thereby substantially obviating the above discussed problem.

It is a related object of the present invention to provide a method of manufacturing the improved thin film magnetic head of the type referred to above.

BRIEF DESCRIPTION OF THE DRAWINGS

Other objects and features of the present invention will become apparent from the following detailed description taken in conjunction with preferred embodiments thereof with reference to the accompanying drawings, in which.

DETAILED DESCRIPTION OF THE INVENTION

Figure 1:
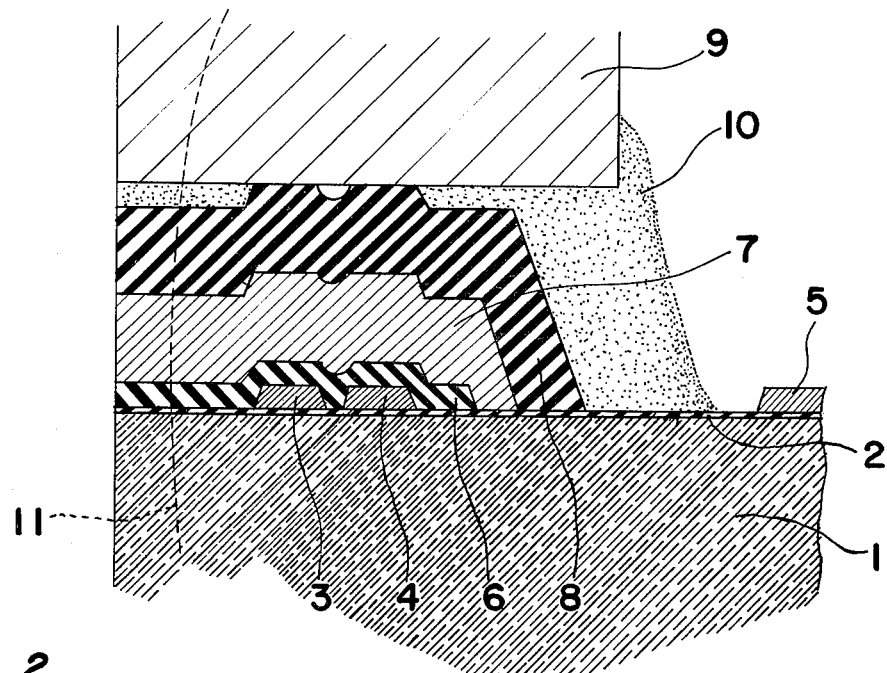
FIGS. 1 and 2 are side sectional and front sectional views of the prior art thin film magnetic head, reference to which has already been made.

Before the description of the present invention proceeds, it is to be noted that like parts are designated by like reference numerals throughout the several views of FIGS. 3 to 8.

Figure 3:
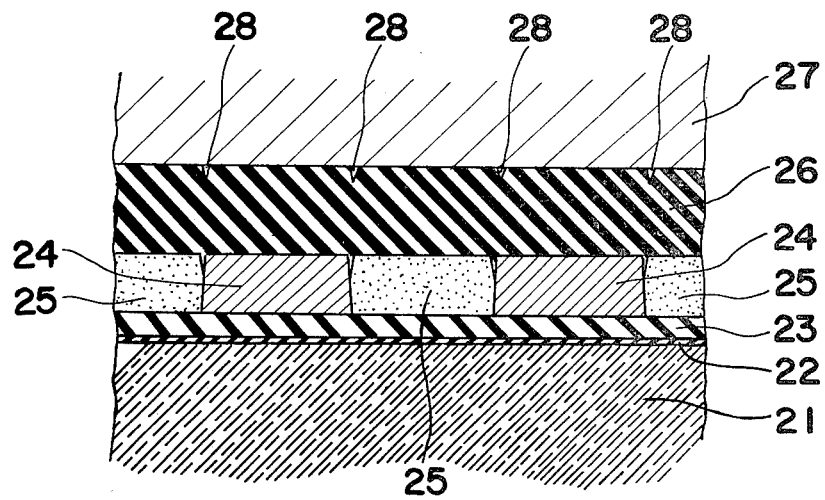
FIG. 3 is a front sectional view of a thin film magnetic head constructed according to the present invention.

Referring first to FIG. 3, reference numeral 21 represents a magnetic substrate which may be made of either a magnetic material, such as ferrite, or a non-magnetic material, such as silicon or glass, coated with a magnetic layer of Fe-Ni alloy or Fe-Si-Al alloy. This substrate 21 has one surface overlaid with a first non-magnetic insulating layer 22 for electrically insulating the other components of the magnetic head, as will be subsequently described, from the substrate 21. It is to be noted that by selecting an appropriate material for the first non-magnetic insulating layer 22, the latter can be made to serve not only as an electric insulator, but also as an element for improving the surface condition of the substrate 21 and also for protecting the surface of the substrate 21 from any possible contact with an etching solution which is used to form the other components on the first non-magnetic insulating layer 22 as will be described later. However, where no electric insulation is required and no protective layer is required on the substrate 21, the first non-magnetic insulating layer 22 may be omitted.

Figure 2:
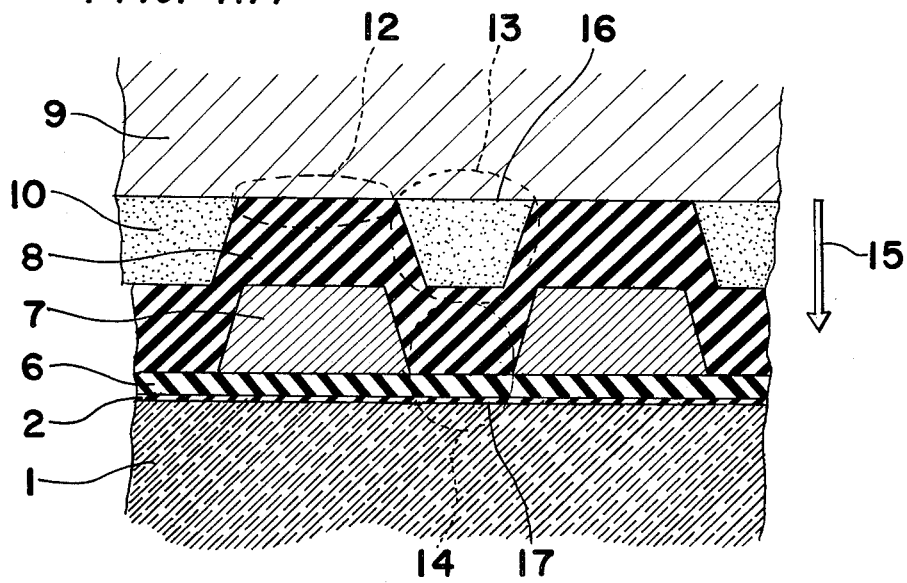

Deposited on the first non-magnetic insulating layer 22 is a second non-magnetic insulating layer 23, which functionally corresponds to the non-magnetic insulating layer 2 shown in FIGS. 1 and 2. A plurality of thin magnetic layers 24 made of Fe-Ni alloy or Fe-Si-Al alloy and having a thickness within the range of 3 to 5 μm is deposited on the second non-magnetic insulating layer 23 in spaced relation to each other. The number of the thin magnetic layers 24 is chosen in consideration of or equal to the number of recording or recorded tracks on the magnetic tape in connection with which the thin film magnetic head is operated and, as thus far illustrated, two thin magnetic layers 24 are shown so that the thin film magnetic head of the present invention can be used in two-channel recording and/or reproduction. It is to be noted that the width Tw of each of the thin magnetic layers 24 corresponds to the width of the corresponding track on the magnetic tape and the sum of the respective thicknesses of the non-magnetic insulating layers 22 and 23 corresponds to a gap length g.

Reference numeral 25 represents a plurality of third non-magnetic insulating layers each positioned on the second non-magnetic insulating layer 23 and between each adjacent two of the thin magnetic layers 24. Each of the third non-magnetic insulating layers 25 has a thickness substantially equal to or equal to the thickness of the thin magnetic layers 24. If desired or should the necessity arise, a fourth non-magnetic insulating layer 26 may be employed to overlay the layers 24 and 25, to which a retainer plate 27 made of silicon or glass is bonded by the use of a bonding material. When a resin binder is used for the bonding material to connect the retainer plate 27 to the fourth non-magnetic insulating layer 26 if the latter is employed as shown, only small deposits of the resin binder are exposed on the head-to-tape contact surface as shown by 28 in FIG. 3.

The first to fourth non-magnetic insulating layers 22, 23, 25 and 26 may be formed of silicon monoxide, silicon dioxide, alumina or silicon carbonate by the employment of any known vapor-depositing technique, spattering technique or photo-etching technique.

Figure 4A:
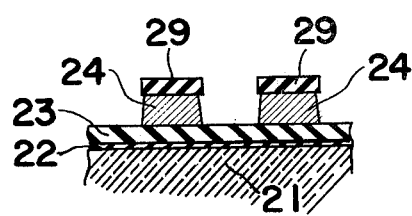
FIGS. 4(a) to 4(c) illustrate one sequence, in one the manufacture of the thin film magnetic head according to the present invention.

Hereinafter, the process of formation of the thin magnetic layers 24 and the third non-magnetic insulating layers 25 will be described with particular reference to FIGS. 4(a) to 4(c). Subsequent to the formation of the second non-magnetic insulating layer 23 on the substrate 21 with or without the first non-magnetic insulating layer 22 interposed between the substrate 21 and the second non-magnetic insulating layer 23, a magnetic material is deposited on the third non-magnetic insulating layer 23 by the employment of any known vapor-depositing technique or any known spattering technique, the resultant layer of the magnetic material being subsequently partially removed by the use of any known photoetching technique to form the thin magnetic layers 24 in a predetermined pattern as shown in FIG. 4(a).

Figure 4B:
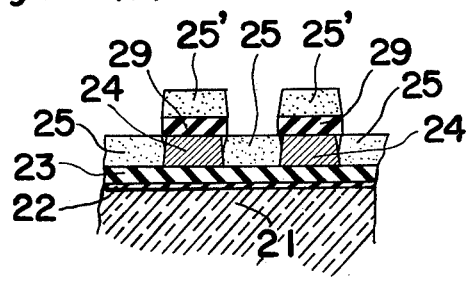
Figure 4C:
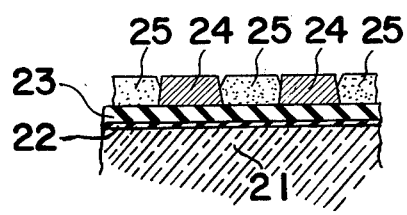

While photo-resist layers 29 remain on the respective thin magnetic layers 24, a non-magnetic insulating material is deposited so as to overlay the photo-resist layers 29 by the use of any known vapor-depositing technique or any known spattering technique to a thickness equal to the thickness of the thin magnetic layers 24 positioned on the second non-magnetic insulating layer 23 and beneath the photo-resist layers 29 as shown in FIG. 4(b). During this process, care must be taken to avoid possible elevation of the temperature of the substrate 21 which may adversely affect the physical and chemical properties of the layers 29. Thereafter, respective portions 25' of the layer of non-magnetic insulating material positioned above the photo-resist layers 29 are removed together with the photo-resist layers 29, thereby leaving the remaining portions of the layer of non-magnetic insulating material, that is, the third non-magnetic insulating layers 25, as shown in FIG. 4(c). The subsequent process for the completion of the manufacture of the thin film magnetic head may be carried out by any known method.

The method of formation of the non-magnetic insulating layers 25 as described above and with reference to FIGS. 4(a) to 4(c) is advantageous in that the photo-resist layers 29 used to form the thin magnetic layers 24 in the predetermined pattern by the use of the photo-etching technique can be used as a pattern mask required for the subsequent formation of the third non-magnetic insulating layers 25. This method has been found effective to form the layers 24 and 25 with no voids or pockets therebetween.

However, the method described with reference to and shown in FIGS. 4(a) to 4(c) may involve a problem caused by the elevated temperature during the deposit of the non-magnetic insulating material for the third non-magnetic insulating layers 25, that is, during the performance of the step of FIG. 4(b). More specifically, although such a problem does not arise where silicon oxide is deposited by the use of any known vapor-depositing technique, the use of silicon carbonate in combination with the known spattering technique may cause the temperature of the substrate 21 to increase to about 150° C. and, therefore, the photo-resist layers 29 tend to be thermally set and consequently deformed to such an extent that the subsequent removal of these layers 29 can not be carried out without substantial difficulty.

Figure 5A:
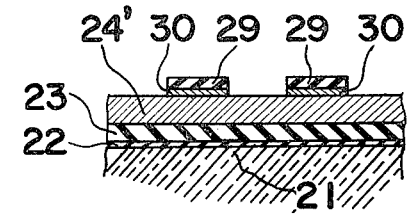
FIGS. 5(a) to 5(d) illustrate an alternative sequence of steps for the manufacture of the thin film magnetic head according to the present invention.

This possibility can be substantially obviated by the following alternative method which will now be described with particular reference to FIGS. 5(a) to 5(d). Subsequent to the formation of a thin layer 24' of magnetic material for the thin magnetic layers 24 on the second non-magnetic insulating layer 23 on the substrate 21, a layer of a metallic material, for example, aluminum, capable of being etched by an alkaline etching solution is vapor-deposited, or otherwise spattered, on the thin layer 24' of the magnetic material in any known manner. Thereafter, resist layers 29 are placed on the metallic layer overlaying the thin magnetic layer 24' in a predetermined pattern complementary to the arrangement of the ultimately formed thin magnetic layers 24, which resist layers 29 serve as masking elements resistant to the alkaline etching solution. Then, by the use of the alkaline etching solution, the portions of the metallic layer overlaying the thin magnetic layer 24' other than those occupied by the resist layers 29 are etched out to leave aluminum layers 30 between each thin magnetic layer 24' and the associated resist layer 29 as shown in FIG. 5(a). It is to be noted that, since Fe-Ni alloy in general will not be etched by the alkaline etching solution used during the etching of the metallic layer to provide the aluminum layers 30, these portions of the metallic layer other than those covered by the resist layers 29 will be the only positions etched to expose the thin magnetic layer 24'.

Figure 5B:
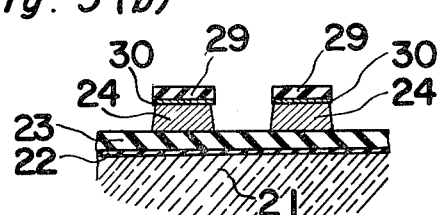

Subsequent to the formation of the aluminum layers 30 in the manner described above, the portions of the thin magnetic layer 24' other than those occupied by the aluminum layers 30 beneath the respective resist layers 29 are etched out to provide the thin magnetic layers 24 as shown in FIG. 5(b). It is to be noted that the resist layers 29 may be removed either before or after the etching of the thin magnetic layer 24' to provide the thin magnetic layers 24.

Figure 5C:
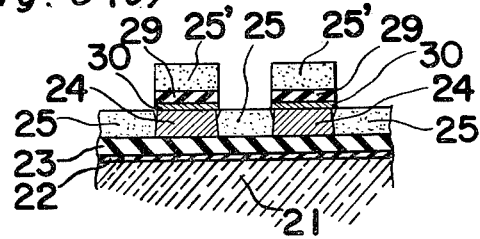

After the formation of the thin magnetic layers 24 in the manner described above, a layer 25' of a non-magnetic insulating material is deposited on the second non-magnetic insulating layer 23 and overlaying the resist layers 29 positioned respectively above the thin magnetic layers 24 through the aluminum layers 30, the deposition of said non-magnetic insulating material being made to a thickness equal to the thickness of the thin magnetic layers 24, as shown in FIG. 5(c). It is to be noted that even though the temperature of the substrate 21 is increased during the formation of the non-magnetic insulating layer 25' for the third non-magnetic insulating layers 25 and, therefore, the resist layers 29 may be thermally damaged, the aluminum layers 30 serve as normal masking elements.

Figure 5D:
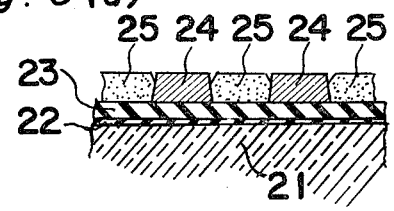

The intermediate product thus formed is then immersed in an etching solution to dissolve the aluminum layers 30 to remove the resist layers 29 and portions of the non-magnetic insulating layer 25' which overlay the respective resist layers 29, thereby forming the third non-magnetic insulating layers 25 as shown in FIG. 5(d).

Figure 6A:
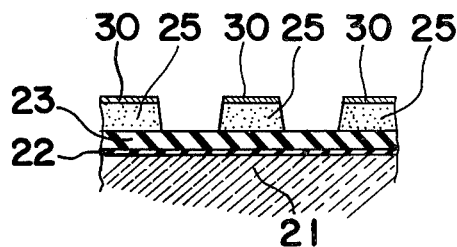
FIGS. 6(a) and 6(b) illustrate a modified form of the method of manufacture of the thin film magnetic head according to the present invention.
Figure 6B:
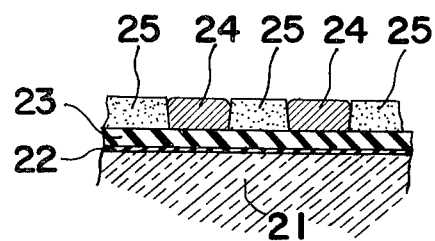

In either of the methods respectively shown in FIGS. 4(a) to 4(c) and FIGS. 5(a) to 5(d), the formation of the third non-magnetic insulating layers 25 has been described as carried out subsequent to the formation of the thin magnetic layers 24. However, the order of these steps may be reversed. More specifically, in the case of the method described with reference to and shown in FIGS. 5a-5d as shown in FIGS. 6a and 6b subsequent to the formation of the non-magnetic insulating layer 23, a layer of a non-magnetic insulating material for the ultimate third non-magnetic insulating layers 25 is deposited on the second non-magnetic insulating layer 23, following the deposition of a metallic layer of aluminum for the ultimate aluminum layers 30. Thereafter, respective portions of the non-magnetic insulating layer for the ultimate layers 25 and the metallic layer for the ultimate layers 30 are etched out to provide the third non-magnetic insulating layers 25 having the aluminum layers 30 mounted thereon as shown in FIG. 6(a). Thereafter, a thin layer of magnetic material for the ultimate thin magnetic layers 24 is deposited so as to overlay the layers 25 and 30 to a thickness equal to the thickness of the third non-magnetic insulating layers 25 and then the aluminum layers 30 are etched out to facilitate the removal of portions of the magnetic material which overlay the third non-magnetic insulating layer 25, thereby providing the thin magnetic layers 24 as shown in FIG. 6(b).

Figure 7:
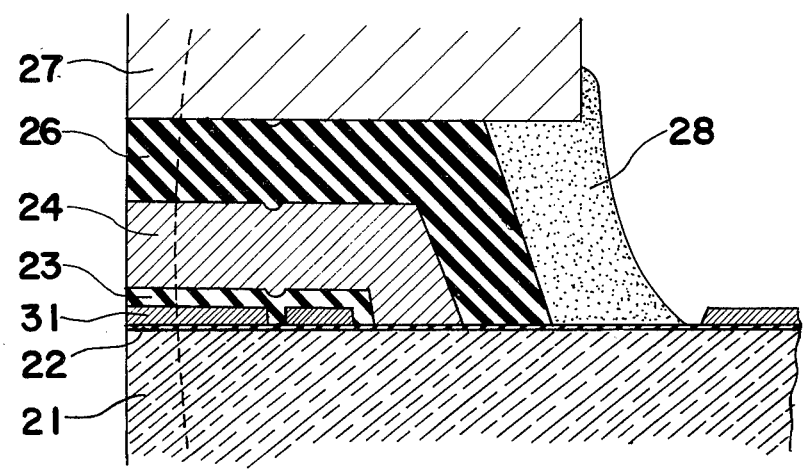
FIGS. 7 and 8 are side sectional and front sectional views, respectively, of the thin film magnetic head according to another preferred embodiment of the present invention.
Figure 8:
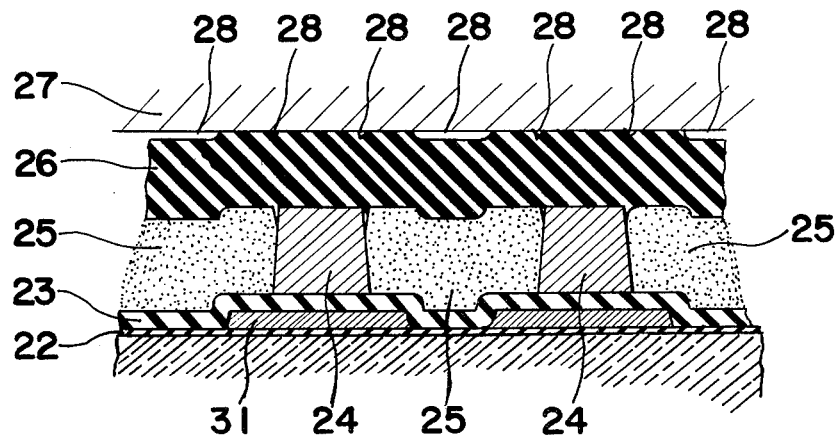

In the construction of the present invention described hereinbefore, conductive layers 31 such as shown in FIGS. 7 and 8 can be applied to a magnetic head appearing at the head-to-tape contact surface of the thin film magnetic head. In this case, even though the resin binder deposits 28 are exposed through the head-to-tape contact surface, the total amount of the resin binder deposits 28 so exposed is smaller than that in the prior art thin film magnetic head and, therefore, they do not obstruct to the achievement of the various effects obtainable by the present invention.

As hereinbefore fully described, since the third non-magnetic insulating layers each having a thickness equal to the thickness of the thin magnetic layers and having a wear resistance substantially equal to or higher than that of the thin magnetic layers are formed on the supporting substrate in side-by-side relation to the respective thin magnetic layers, the amount of the resin binder deposits which are exposed to the outside through the head-to-tape contact surface is smaller than that in the prior art device of a similar kind. Because of this feature, the possibility of chapping of the head-to-tape contact surface can advantageously be minimized or substantially eliminated as compared with the prior art thin film magnetic head wherein the head-to-tape contact surface tends to be easily chapped after a relatively short period of use.

Moreover, according to the present invention, since a photoetching technique is employed in forming the third non-magnetic insulating layers and the thin magnetic layers as described hereinbefore, and since the undesired portion of the non-magnetic insulating material or the thin layer of magnetic material overlaying the resist layers are removed simultaneously with the removal of such resist layers, the method of manufacture of the thin film magnetic head according to the present invention is simple and, therefore, advantageous in that not only can the production line be simplified, but also the third non-magnetic insulating layers and the thin magnetic layers can be mounted on the supporting substrate with no voids or pockets being formed therebetween.

Although the present invention has been fully described by way of example, it is to be noted that various changes and modifications will be apparent to those skilled in the art. Such changes and modifications are to be understood as being included within the true scope of the present invention unless they depart therefrom.

We claim:

1. A multi-track thin film magnetic head having a contact surface which, when the magnetic head is in use, is in sliding contact with a magnetic information carrier for recording and/or reproducing information, said magnetic head comprising, in combination;
   a supporting substrate of magnetic material
   a layer of non-magnetic electrically insulating material on said substrate having at least one conductor layer therein;
   a further layer of a plurality of side-by-side portions alternate ones of which are metallic magnetic material and the remainder of which are of a non-magnetic electrically insulating material and having a thickness equal to the thickness of said metallic portions and having a wear resistance substantially equal to or higher than the wear resistance of said metallic material portions, said metallic and non-magnetic electrically insulating portions being positioned on the non-magnetic electrically insulating layer with the portions of the non-magnetic insulating layer between said metallic magnetic portions and said magnetic substrate forming transducing gaps; and
   a retainer plate of electrically insulating material plurality of against the surface of said metallic and said non-magnetic electrically insulating portions which are opposite the surfaces contacting said layer of non-magnetic electrically insulating layer;
   the edges of said layers, said portions and said retainer plate together defining said contact surface, and said plurality of portions extending along said contact surface in a direction transverse to the direction of the sliding contact said metallic magnetic portions being magnetically coupled to said magnetic substrate at positions remote from said contact surface to form magnetic circuits.

2. A thin film magnetic head as claimed in claim 1, wherein said metallic magnetic material is a Fe-Ni alloy.

3. A thin film magnetic head as claimed in claim 1, wherein said metallic magnetic material is a Fe-Si-Al alloy.

* * * * *